(12) United States Patent
Lee et al.

(10) Patent No.: US 9,154,349 B2
(45) Date of Patent: Oct. 6, 2015

(54) WIRELESS TRANSMITTER FOR HIGH MOBILITY AND HIGH THROUGHPUT AND MODE CONTROL METHOD THEREOF

(75) Inventors: Il-Gu Lee, Seoul (KR); Sok-Kyu Lee, Daejeon (KR); Hyun-Kyu Chung, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 473 days.

(21) Appl. No.: 12/912,653

(22) Filed: Oct. 26, 2010

(65) Prior Publication Data

US 2011/0096863 A1 Apr. 28, 2011

(30) Foreign Application Priority Data

Oct. 26, 2009 (KR) ........................ 10-2009-0101965

(51) Int. Cl.
*H04L 27/18* (2006.01)
*H04L 7/00* (2006.01)
*H04W 8/26* (2009.01)

(52) U.S. Cl.
CPC . *H04L 27/18* (2013.01); *H04L 7/00* (2013.01); *H04W 8/26* (2013.01)

(58) Field of Classification Search
CPC ...................................................... H04W 8/26
See application file for complete search history.

(56) References Cited

U.S. PATENT DOCUMENTS

| | | | |
|---|---|---|---|
| 2002/0006136 A1* | 1/2002 | Mallory et al. | 370/466 |
| 2003/0142687 A1* | 7/2003 | Lin | 370/419 |
| 2006/0176966 A1* | 8/2006 | Stewart et al. | 375/260 |
| 2007/0201461 A1* | 8/2007 | Shinohara et al. | 370/389 |
| 2007/0291676 A1* | 12/2007 | Berggren | 370/328 |
| 2008/0002780 A1* | 1/2008 | Yu et al. | 375/267 |
| 2008/0043773 A1* | 2/2008 | Ihori | 370/460 |
| 2008/0159203 A1* | 7/2008 | Choi et al. | 370/328 |
| 2008/0205568 A1 | 8/2008 | Oyama | |
| 2009/0111510 A1* | 4/2009 | Ono | 455/552.1 |
| 2009/0124300 A1* | 5/2009 | Park et al. | 455/574 |
| 2009/0185492 A1* | 7/2009 | Senarath et al. | 370/238 |
| 2009/0213760 A1* | 8/2009 | Shin et al. | 370/254 |

FOREIGN PATENT DOCUMENTS

EP 2012553 A1 1/2009
KR 1020070061060 A 6/2007

* cited by examiner

*Primary Examiner* — Brandon Renner

(57) ABSTRACT

A wireless transmitter which performs reconfiguration for high mobility and high throughput includes: an operation mode decision unit configured to decide an operation mode depending on mobility, a required data rate, and wireless link performance; a clock generation unit configured to generate a plurality of clock signals; a selection unit configured to select necessary clock signals among the plurality of clock signals generated by the clock generation unit according to the operation mode decided by the operation mode decision unit; and at least one or more digital modulation units configured to modulate transmitted data by adjusting a signal bandwidth of a frequency domain and a transmission time of a time domain using the clock signals selected by the selection unit.

11 Claims, 14 Drawing Sheets

FIG. 4

| Model | IEEE 802.11a/g | IEEE 802.11p | IEEE 802.11n | IEEE 802.11n-ML1 | IEEE 802.11n-ML2 |
|---|---|---|---|---|---|
| Mode | Legacy-11a/g | Legacy-11p | HT | HT-ML1 | HT-ML2 |
| Bit Rate [Bps] | 6,9,12,18,24,36,48,54 | 3,4.5,6,9,12,18,24,27 | Legacy-11a/g: 6,9,12,18,24,36,48,54 20MHz 1 stream: 6.5, 13, 19.5, 26, 39, 52, 58.5, 65 20MHz 2 stream: 13, 26, 39, 52, 78, 104, 117, 130 40MHz 1 stream: 13.5,27,40.5,54,81,108,121.5,135 40Mhz 2 stream: 27,54,81,108,162,216, 243,270 | Legacy-11p: 3,4.5,6,9,12,18,24,27 20MHz 1 stream: 3.3,6.5,9.8,13,19.5,26 ,29.3, 32.5 20MHz 2 stream: 6.5,13,19.5,26,39.52 58.5,65 40MHz 1 stream: 6.8,13.5,20.3,27,40.5, 54.60.8,67.5 40MHz 2 stream: 13.5,27,40.5,54,81,10 8,121.5,135 | 11p-ML1: 1.5,2,3,3,4.5,6,9,13.5 3.5 20MHz 1 stream: 1.6,3.3,4.9,6.5,9.8,13, 14.6, 16.3 20MHz 2 stream: 3.3,6.5,9.8,13,19.5,26 ,29.3,32.5 40MHz 1 stream: 3.4,6.8,10.1,13.5,20.3 ,27,30.4,33.8 40MHz 2 stream: 6.8,13.5,20.3,27,40.5 ,54.0,60.8,67.5 |
| Antenna Configuration | 1x1 or 2x2 MRC | 1x1 or 2x2 MRC | 2x2 | 2x2 | 2x2 |
| Bandwidth [MHz] | 20 | 10 | 20 or 40 | 10 or 20 | 5 or 10 |
| Modulation Type | BPSK, QPSK, 16QAM, 64QAM | BPSK, QPSK, 16QAM, 64QAM | BPSK, QPSK, 16QAM, 64QAM | BPSK, QPSK, 16QAM, 64QAM | BPSK, QPSK, 16QAM, 64QAM |
| Code Rate | 1/2, 1/3, 1/4 | 1/2, 1/3, 1/4 | 1/2, 2/3, 3/4, 5/6 | 1/2, 2/3, 3/4, 5/6 | 1/2, 2/3, 3/4, 5/6 |
| Number of Subcarriers | 52 | 52 | 108 | 108 | 108 |
| Symbol Duration [us] | 4 | 8 | 4 | 8 | 16 |
| Guard Time [us] | 0.8 | 1.6 | 0.8 or 0.4 | 1.6 or 0.8 | 3.2 or 1.6 |
| FFT Period [us] | 3.2 | 6.4 | 3.2 or 3.6 | 6.4 or 7.2 | 12.8 or 14.4 |
| Preamble Duration [us] | 16 | 32 | 16 | 32 | 64 |
| Sub-carrier Frequency Spacing [kHz] | 312.5 | 156.25 | 312.5 | 156.25 | 78.125 |
| Available ACK policy | Normal ACK | Block ACK, Normal ACK | Block ACK, Normal ACK, Aggregation | Block ACK, Normal ACK, Aggregation | Block ACK, Normal ACK, Aggregation |
| Inter FrameSpace between data packet and ACK packet | SIFS (16us) | SIFS (32us) | SIFS (16us), RIFS (2us) | SIFS (32us), RIFS (4us) | SIFS (64us), RIFS (8us) |
| Power consumption | 4 | 5 (best) | 1 (worst) | 2 | 3 |
| Mobility | 4 | 2 | 5 (worst) | 3 | 1 (best) |
| Max. data rate | 4 | 5 (worst) | 1 (best) | 2 | 3 |

FIG. 5
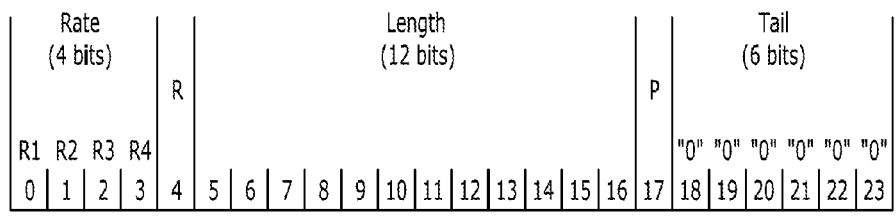
FIG. 6
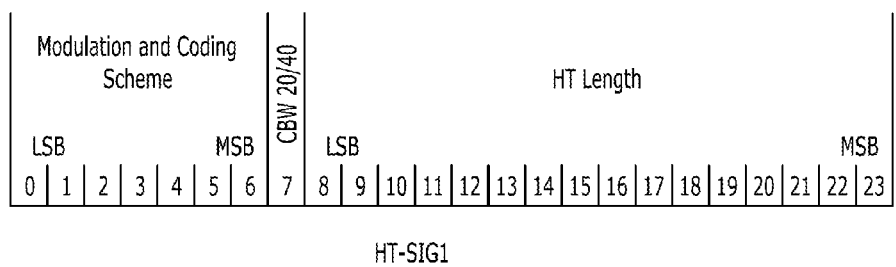
HT-SIG1
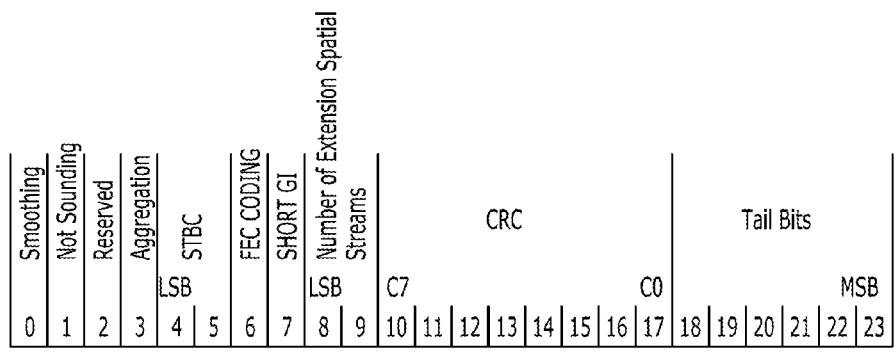
HT-SIG2

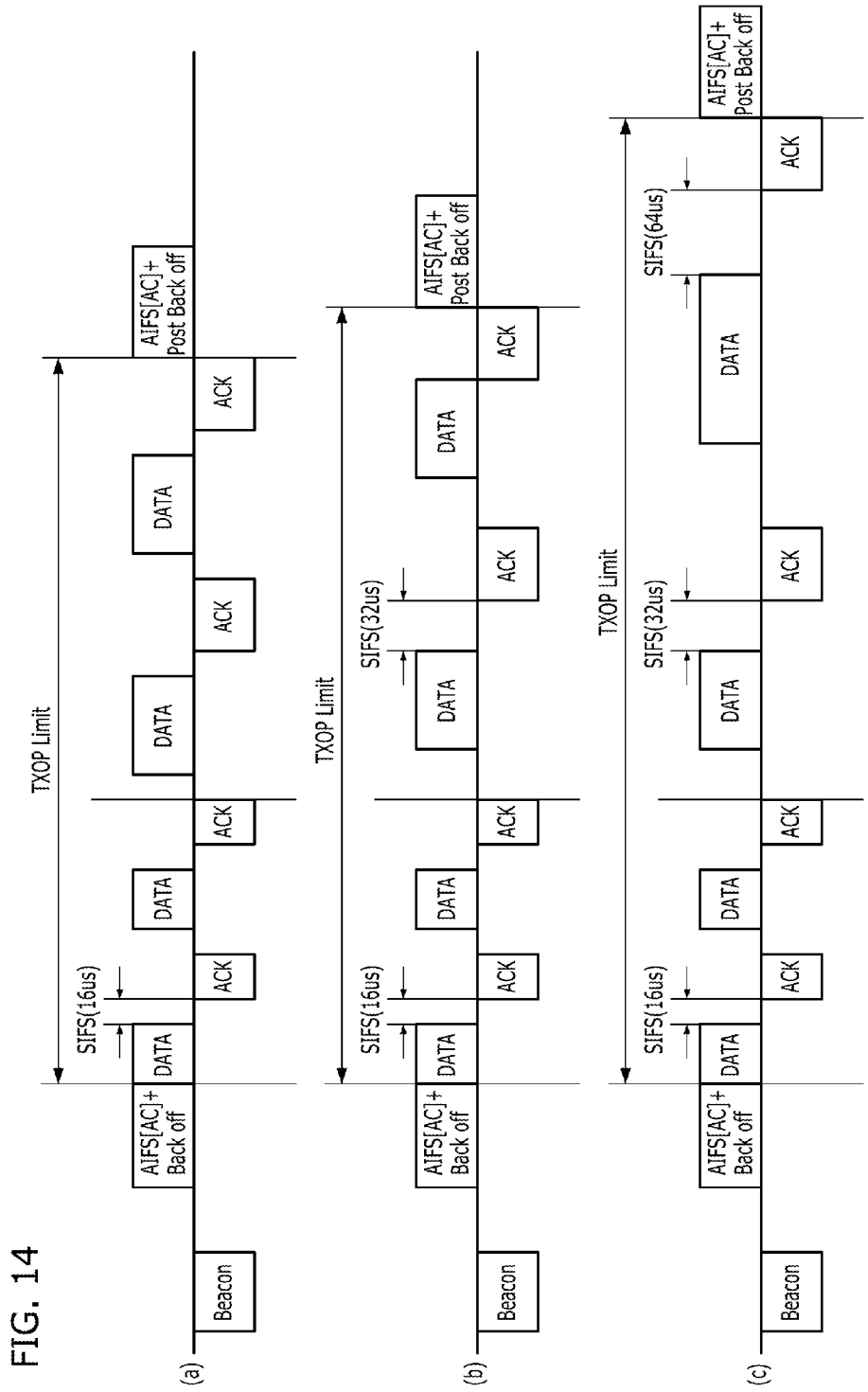

WIRELESS TRANSMITTER FOR HIGH MOBILITY AND HIGH THROUGHPUT AND MODE CONTROL METHOD THEREOF

CROSS-REFERENCE(S) TO RELATED APPLICATIONS

The present application claims priority of Korean Patent Application No. 10-2009-0101965, filed on Oct. 26, 2009, which is incorporated herein by reference in its (their) entirety.

BACKGROUND OF THE INVENTION

1. Field of the Invention

Exemplary embodiments of the present invention relate to a wireless transmitter for high mobility and high throughput and a mode control method thereof; and, more particularly, to an apparatus and method which decides an operation mode of a transmitter depending on a wireless network environment, a channel state, and a user's mobility and reconfigures the transmitter according to the decided operation mode.

2. Description of Related Art

In general, a wireless communication system has developed focusing on a data rate and mobility depending on the purpose of use.

For example, a 2G cellular terminal has been developed to use a service requiring a low data rate, such as a voice data service, while moving by car. Furthermore, a 3G cellular terminal based on a wideband code division multiple access (WCDMA) scheme or a high speed downlink packet access (HSDPA) scheme has been developed to use an Internet searching service or text data service requiring a low data rate while moving. Furthermore, the 3G cellular terminal has been developed to transmit and receive digital video or audio broadcasting by using digital multimedia broadcasting (DMB) technology, while moving by car.

Meanwhile, WiBro technology has been developed to use an Internet searching service or transmit and receive image signals requiring a low data rate, while moving by car. Furthermore, Wi-Fi technology has been developed to transmit high-quality multimedia video at a high data rate by using the IEEE 802.11a/b/g/n standard in a stationary state or low-mobility state. The IEEE 802.11n technology having a maximum data rate of 600 Mbps may transmit a high-quality image oh 100 Mbps or more, and maintain a service quality even in a stationary state or low-mobility state (for example, pedestrian speed).

The IEEE 802.11p technology of which the standardization is in progress for an intelligent mobile communication system may transmit data at a maximum data rate of 27 Mbps in a low-mobility state by using a bandwidth of 10 MHz in the 5.9 GHz frequency band, based on the IEEE 802.11a, and has been developed to transmit data requiring a low data rate even at a high movement speed of 200 km/h. Here, the IEEE 802.11a may transmit data at a maximum data rate of 54 Mbps by using a bandwidth of 20 MHz in the 5 GHz band, based on an orthogonal frequency division multiplexing (OFDM) scheme.

As such, the conventional wireless communication technology, which has developed focusing on the mobility and the high data rate, has the following problems.

Wireless communication terminal users want an environment in which a good quality of service is provided at a high movement speed. However, the currently-developed technologies do not satisfy such users' request. Specifically, the Wi-Fi technology guarantees a high throughput of 600 Mbps, but is not suitable for a mobile environment. Furthermore, the cellular technology may provide a voice communication service under a high-speed movement environment of 200 km/h, but may guarantee only a low data rate such as a voice data level.

Due to the limit of the Wi-Fi or cellular technology, the WiBro and IEEE 802.11p technology has been proposed. However, the WiBro and IEEE 802.11p technology provide a lower performance than the high data rate of the Wi-Fi technology and the high mobility of the cellular technology.

Recently, a demand for HD images or high-volume multimedia contents such as movies and music has been increasing. The maximum data rate of 27 Mbps in the IEEE 802.11p technology is not enough to provide a good quality of service to a plurality of users at the same time. That is, the IEEE 802.11p technology provides a data rate of 11 Mbps as the throughput of a media access control (MAC) layer when the channel state is favorable, and provides a much lower data rate while moving at a high speed or when a distance between terminals is large. Furthermore, as the mobility of a wireless terminal user increases in the IEEE 802.11p technology, the performance of the wireless terminal may be significantly degraded by a channel variation caused by a Doppler spread effect and a delay spread effect.

SUMMARY OF THE INVENTION

An embodiment of the present invention is directed to a wireless transmitter which is capable of deciding an operation mode depending on a wireless network environment, a channel state, and user's mobility and performing reconfiguration according to the decided operation mode.

Another embodiment of the present invention is directed to a method for deciding an operation mode of a wireless transmitter depending on a wireless network environment, a channel state, and user's mobility and controlling the operation mode of the wireless transmitter.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a wireless transmitter which performs reconfiguration for high mobility and high throughput includes: an operation mode decision unit configured to decide an operation mode depending on mobility, a required data rate, and wireless link performance; a clock generation unit configured to generate a plurality of clock signals; a selection unit configured to select necessary clock signals among the plurality of clock signals generated by the clock generation unit according to the operation mode decided by the operation mode decision unit; and at least one or more digital modulation units configured to modulate transmitted data by adjusting a signal bandwidth of a frequency domain and a transmission time of a time domain using the clock signals selected by the selection unit.

The operation mode decision unit may decide the operation mode by using a current traffic volume and a time domain parameter or by using a current traffic volume and a frequency domain parameter.

The operation mode decision unit may decide the operation mode by using a request frame and a response frame with a corresponding station.

The operation mode decision unit may determine the operation mode by using a signal field of a media access control (MAC) frame. In this case, the operation mode decision unit may determine the operation mode by using a reserved bit of the signal field of the MAC frame.

In accordance with another embodiment of the present invention, a wireless transmitter which performs reconfiguration for high mobility and high throughput includes: an operation mode decision unit configured to decide an operation mode depending on mobility, a required data rate, and wireless link performance; and at least one or more digital modulation units configured to modulate transmitted data by adjusting a cyclic prefix length according to the operation mode decided by the operation mode decision unit.

The operation mode decision unit may decide the operation mode by using a short guard interval (GI) field of a signal field of a MAC frame.

In accordance with another embodiment of the present invention, there is provided a mode control method in a wireless transmitter which performs reconfiguration for high mobility and high throughput. The mode control method includes: deciding a mode depending on a supportable data rate and a required traffic volume; determining a current wireless link state by using a time domain parameter; and deciding a physical layer mode for increasing or decreasing a mobility level or a data rate according to the result of said determining the current wireless link state by using the time domain parameter.

In accordance with another embodiment of the present invention, there is provided a mode control method in a wireless transmitter which performs reconfiguration for supporting high mobility and high throughput. The mode control method includes: deciding a mode depending on a supportable data rate and a required traffic volume; determining a current wireless link state by using a frequency domain parameter; and deciding a physical layer mode for increasing or decreasing a mobility level or a data rate, according to the result of said determining the current wireless link state by using the frequency domain parameter.

BRIEF DESCRIPTION OF THE DRAWINGS

FIG. 4 is a table showing physical layer parameters for each mode.

FIG. 5 is a diagram showing a signal field structure of a general legacy mode (IEEE 802.11a/g).

FIG. 6 is a diagram showing a signal field structure of a general HT mode (IEEE 802.11n).

FIG. 14 is a diagram showing mode switching and timing variation in accordance with the embodiment of the present invention.

DESCRIPTION OF SPECIFIC EMBODIMENTS

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

Hereafter, when the exemplary embodiments of the present invention are described, various standards belong to the Wi-Fi technology will be taken as examples. However, the embodiments of the present invention are not limited to the Wi-Fi technology, and may be applied to existing wireless communication standards or expanded on the basis of as the same principle. In general, the Wi-Fi technology is also referred to as wireless LAN (WLAN) technology.

In order for understanding of the present invention, the following Wi-Fi modes will be defined and described depending on a mobility level and a maximum data rate. The respective Wi-Fi modes may be divided in detail depending on guard interval (GI) modes.

1. Wi-Fi mode according to mobility level (ML) and data rate
 1) Legacy-11a/g mode (IEEE 802.11a/g standard): Maximum data rate of 54 Mbps and Low ML
 2) Legacy-11p mode (IEEE 802.11p standard): Maximum data rate of 27 Mbps and Mid ML
 3) 11p-ML1 mode: Maximum data rate of 13.5 Mbps and High ML
 4) HT-11n mode (IEEE 802.11n standard): Maximum data rate of 270 Mbps (2×2, 0.8 us GI) and Low ML
 5) 11n-ML1 mode: Maximum data rate of 135 Mbps (2×2, 0.8 us GI) and Mid ML
 6) 11n-ML2 mode: Maximum data rate of 67.5 Mbps (2×2, 0.8 us GI) and High ML
 7) VHT mode (IEEE 802.11ac standard)
 8) 11ac-ML0/1/2 mode: applied as the same principle
2. Guard interval (GI) mode
 1) 0.4/0.8 us for IEEE 802.11n
 2) 0.4/0.8/1.2 us for IEEE 802.11ac (expandable to 1.6 us or more)

Figure 1:
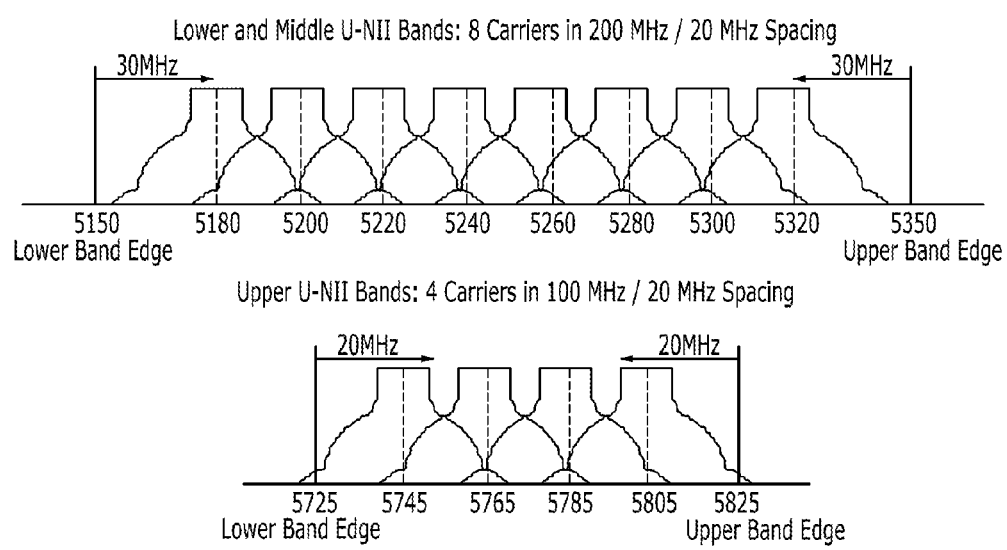
FIG. 1 is a diagram showing the 5 GHz band WLAN frequencies for the IEEE 802.11a/n.
Figure 2:
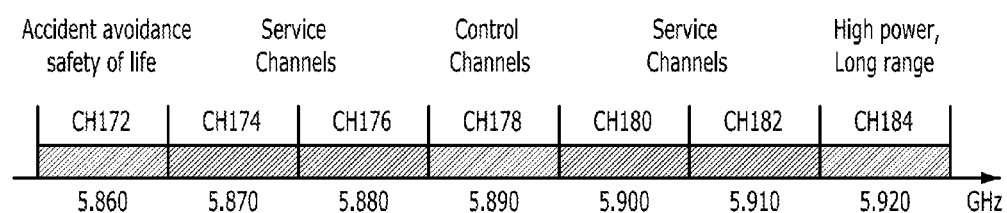
FIG. 2 is a diagram showing general 5 GHz band WLAN frequencies.

FIGS. 1 and 2 show examples of WLAN frequencies in the 5 GHz band. FIG. 1 is defined for the IEEE 802.11a/n standard, and FIG. 2 is defined for the IEEE 802.11p standard.

Such a frequency policy has the following intent. The frequency band used by low-mobility and short-range wireless transmission Wi-Fi stations and the frequency band used by high-mobility wireless transmission Wi-Fi stations are separately defined to minimize a signal interference problem, and transmit power gains are differently defined to facilitate the design of standard stations to be used in different environments.

The embodiments of the present invention include technology which may reconfigure a station depending on the mobility of a terminal user, a required data rate, and an environment variation in the Wi-Fi standard which has developed in the above-described manner.

Figure 3:
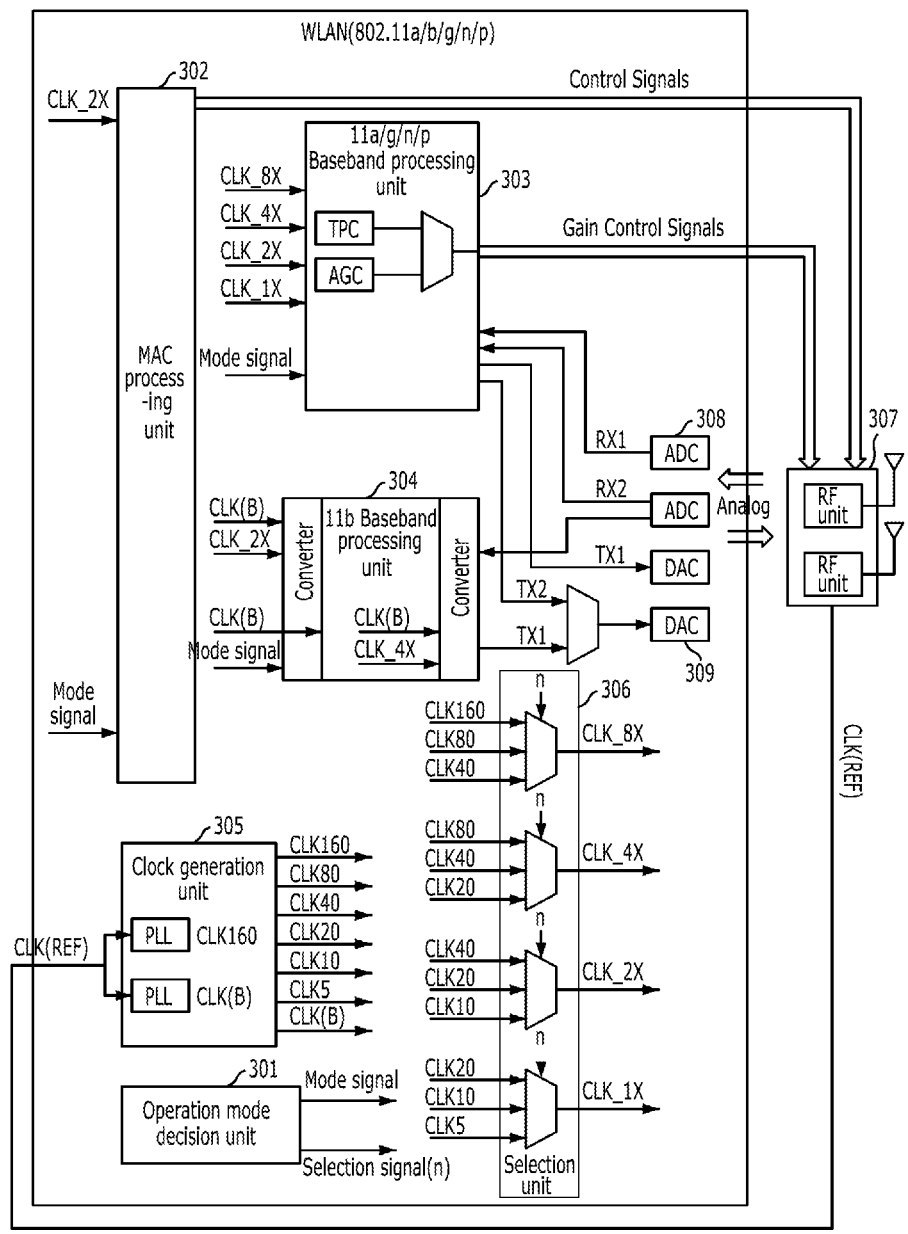
FIG. 3 is a block diagram of a wireless transmitter in accordance with an embodiment of the present invention.

FIG. 3 is a block diagram of a WLAN transmitter in accordance with an embodiment of the present invention.

The WLAN transmitter operates in the frequency domains of the 2.4 GHz band and the 5 GHz band for the WLAN standard, and may reconfigure a band limiting filter of a radio frequency (RF) unit 307 into 2.5 MHz, 5 MHz, 10 MHz, and 20 MHz bands. The band limitation filter mode and the RF center frequency of the RF unit 307 are selected by a MAC processing unit 302. The MAC processing unit 302 controls the RF unit 307 by using the selected band limitation filter mode and the selected RF center frequency.

In the WLAN transmitter in accordance with the embodiment of the present invention, an operation mode decision unit 301 for deciding an operation mode may be provided separately from the MAC processing unit 302, or the MAC processing unit 302 may include a function of deciding an operation mode.

The operation mode decision unit 301 is configured to decide an operation mode by considering a mobility level, a traffic volume, and a current wireless environment, and output a selection signal n for controlling a selection unit 306 and the decided mode signal.

FIG. 3 shows an example in which a clock oscillator at a specific frequency and a digital clock divider are used as a clock generator. However, the embodiment of the present invention may be expanded to a case in which a variety of frequency combination and clock generation methods are used. Furthermore, in this embodiment of the present invention, a multi-antenna structure using two antennas will be taken as an example. However, the multi-antenna structure may be easily expanded to a multi-antenna structure using three or more antennas.

When a user does not move or moves at a low speed, the wireless transmitter in accordance with the embodiment of the present invention operates in the IEEE 802.11a/b/g/n mode. However, when the mobility increases, the wireless transmitter is switched to ½ bandwidth mode of the IEEE 802.11p or IEEE 802.11n or ¼ bandwidth mode of the IEEE 802.11n.

The mode switching is performed by the following method. Referring to FIG. 3, a phase locked loop (PLL) of the clock generation unit 305 receives a reference clock signal from the RF unit 307 or an external clock oscillator and provides a variety of clock signals which are to be used by digital modem units such as baseband processing units 303 and 304, through frequency division. In this embodiment, it is assumed that the clock generation unit provides 5, 10, 20, 40, 80, and 160 MHz clock signals.

When it is assumed that 20, 40, 80, and 160 MHz clock signals are used in the IEEE 802.11a/g/n mode, 10, 20, 40 and 80 MHz clock signals may be used in the ½ bandwidth mode of the IEEE 802.11p or IEEE 802.11n. The selection unit 306 may be configured as a multiplexing circuit for selecting such clock signals. The selection unit 306 selects the clock signals generated by the clock generation unit 305 according to the selection signal n transferred from the operation mode decision unit 301, and then transfers the selected signals to the digital modem units such as the baseband processing units 303 and 304.

Accordingly, 5, 10, 20, and 40 MHz clock signals are used in the ½ bandwidth mode of the IEEE 802.11p or the ¼ bandwidth mode of the IEEE 802.11n. When the clock frequency is reduced to the half, the signal bandwidth of the frequency domain may be reduced to the half, and the transmission time of a time-domain signal may be doubled. The signal of which the transmission time is doubled in the time domain has a cyclic prefix which is doubled, and thus becomes strong against a signal delay effect.

Referring to FIG. 3, the baseband processing units are separately provided, because the IEEE 802.11b uses a direct sequence spread spectrum (DSSS) scheme which is different from the OFDM scheme of the IEEE 802.11a/n. That is, the baseband processing units may include the 11a/g/n/p baseband processing unit 303 and the 11b baseband processing unit 304. The baseband processing units serving as the digital modem units perform a function of modulating transmitted data by adjusting a signal bandwidth of the frequency domain and/or a transmission time of the time domain by using clock signals inputted according to the decided operation mode. Meanwhile, the baseband processing units perform a function of adjusting the length of a cyclic prefix according to the decided operation mode. The specific operation of the digital modem units will be described below.

In this embodiment of the present invention, a clock signal of the MAC layer as well as the clock signal of the physical layer such as the baseband processing unit is adjusted. Furthermore, a timer for protocol control may be selectively adjusted according to the standard. Furthermore, the wireless transmitter in accordance with the embodiment of the present invention includes a device for controlling a GI mode. Therefore, the Wi-Fi mode and the guard interval mode are controlled depending on an available frequency and bandwidth, a terminal mobility level, and a required data rate.

In FIG. 3, reference numeral 308 represents an analog digital converter (ADC), and reference numeral 309 represents a digital analog converter (DAC).

The operation mode decision unit 301 is configured to select any one of the IEEE 802.11a/b/g/n/p mode, the ½ bandwidth mode of the IEEE 802.11p, the ½ bandwidth mode of the IEEE 802.11n, and the ¼ bandwidth mode of the IEEE 802.11n. At this time, the operation mode decision unit 301 adaptively decides an operation mode depending on a required data rate and a link performance such as a traffic volume, a movement speed of a wireless terminal, a Doppler shift, a delay effect, a packet error rate, or a signal-to-noise ratio (SNR) of a received signal.

FIG. 4 is a table showing the IEEE 802.11a mode, the IEEE 802.11p mode, the IEEE 802.11n mode, and modes which are newly defined for the embodiment of the present invention.

Referring to FIG. 4, the data rate of the IEEE 802.11p is sacrificed 50% by reducing the frequency bandwidth of the IEEE 802.1a, but the IEEE 802.11p becomes strong against the signal delay effect. Furthermore, the efficiency of the IEEE 802.11p is lost 50% by reducing the frequency bandwidth of the IEEE 802.11n, but the IEEE 802.11p becomes strong against the signal delay effect. In a high-mobility environment, the maximum data rate of the HT-ML1 mode may become five times larger than that of the IEEE 802.11p. Furthermore, the data rate of the ¼ bandwidth mode of the IEEE 802.11n is 2.5 times larger than that of the IEEE 802.11p, and the cyclic prefix thereof is two times larger than that of the IEEE 802.11p. Therefore, the ¼ bandwidth mode of the IEEE 802.11p has an advantage in terms of both the mobility and the data rate.

Meanwhile, the embodiments of the present invention include an intelligent frequency allocation method for determining whether two 10 MHz channels are available or not, in order to follow a 10 MHz-based frequency policy of the IEEE 802.11p for the ½ bandwidth mode of the IEEE 802.11n. For this, in accordance with the embodiment of the present invention, a center frequency conversion process, a reconfiguration process of the band limitation filter, a scanning and carrier sensing process are performed. Furthermore, a reconfiguration process for optimizing the data rate, the network configuration, and the transmitter in a given channel environment is performed by measuring the signal field information or traffic volume of a transmitted packet, the mobility level, the Doppler shift, the delay effect, and the packet error rate.

Mode Selection Method Using Signal Field Information of Transmitted Packet

Hereafter, a mode selection method using the signal field information of a transmitted packet will be described.

The existing WLAN standards propose a signal field structure as shown in FIGS. 5 and 6. FIG. 5 shows the structure of a legacy signal field L-SIG compatible with the IEEE 802.11a/g, and FIG. 6 shows the structure of a HT signal field HT-SIG of the IEEE 802.11n.

Figure 7:
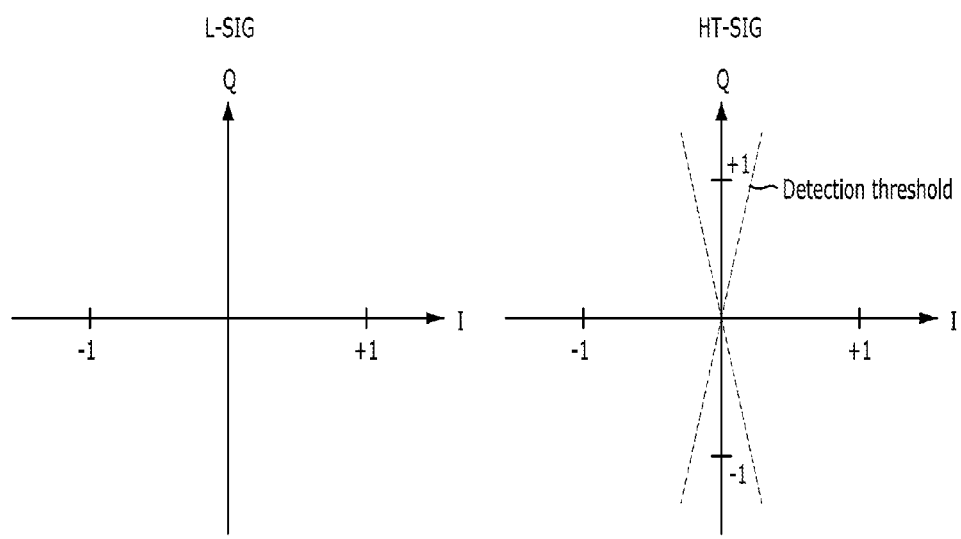
FIG. 7 is a diagram explaining a general HT mode auto-detection process.

In order for HT mode auto-detection, the legacy signal field L-SIG is mapped according to a binary phase shift keying (BPSK) scheme and then transmitted, and the HT signal field HT-SIG is mapped according to a quadrature-BPSK scheme and then transmitted, as shown in FIG. 7.

When receiving a packet, a reception terminal determines whether the next signal of the legacy signal field is a HT signal field or legacy data signal, based on a detection threshold value as shown in FIG. 7. Through this operation, the reception terminal may decide the mode of the received packet.

Figure 8:
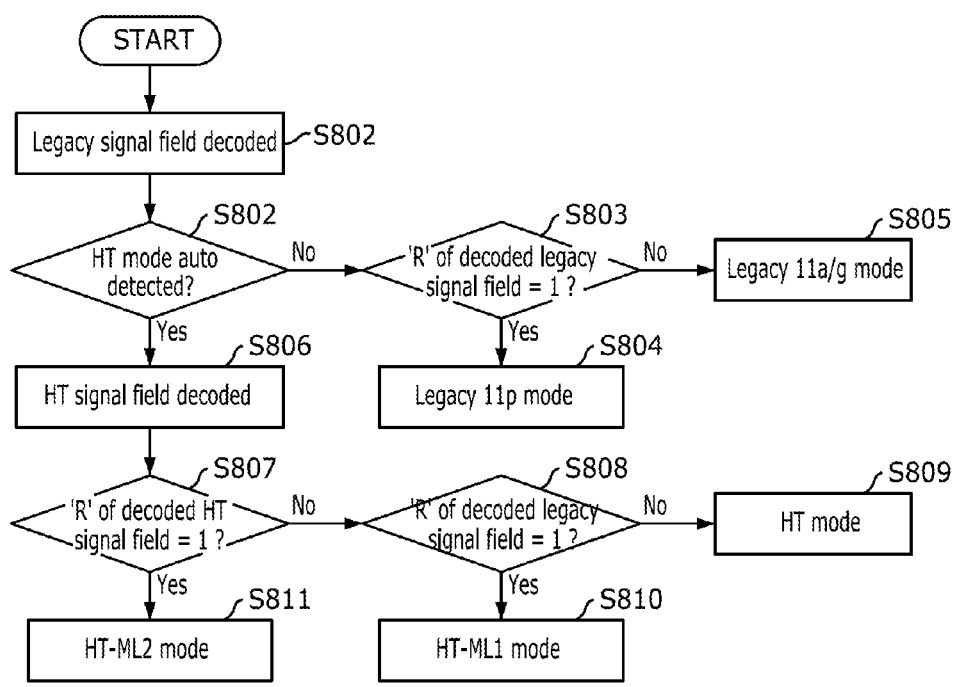
FIG. 8 is a flow chart showing a mode selection method in the wireless transmitter in accordance with the embodiment of the present invention.

Referring to FIG. 8, the mode decision process in accordance with the embodiment of the present invention will be described in more detail. First, the legacy signal field L-SIG is decoded at step S801, and the HT mode auto-detection is performed at step S802 through the method as described with reference to FIG. 7.

When it is determined as the result of the HT mode auto-detection that the mode of the packet is not the HT mode, a reserved bit R of the decoded legacy signal field L-SIG is checked at step S803. When the reserved bit R of the legacy signal field L-SIG is 0, the mode is decided to be the 802.11a/g mode at step S805. In the case of the 5 GHz band, the mode corresponds to 802.11a, and in the case of the 2.4 GHz band, the mode is decided to be 802.11g. When the reserved bit R of the legacy signal field L-SIG is 1, the mode is decided to be the legacy-11p mode as the 802.11p mode at step S804.

Meanwhile, when it is determined as the result of the HT mode auto-detection that the mode of the packet is the HT mode, the HT signal field is decoded at step S806. Then, a reserved bit R of the decoded HT signal field HT-SIG and the reserved bit R of the decoded legacy signal field L-SIG are checked at steps S807 and S808.

When both the reserved bit R of the legacy signal field and the reserved bit R of the HT signal field are 0, the mode is decided to be the 802.11n mode (HT mode) at step S809. When the reserved bit R of the HT signal field is 0 and the reserved bit R of the legacy signal field is 1, the mode is decided to be the HT-ML1 mode which is a high mobility level mode (Mobility Level 1) at step S810. When the reserved bit R of the HT signal field is 1, the mode is decided to be the HT-ML2 mode which is a very high mobility level mode (Mobility Level 2) at step S811.

In accordance with the embodiment of the present invention, the current support mode of the system supporting the plurality of modes may be discriminated through a combination of reserved bits of plural signals fields in a frame including the legacy signal filed L-SIG and the HT signal field HT-SIG.

The above-described selection process of the Wi-Fi mode is accompanied by a change in bandwidth to be used. In this embodiment of the present invention, however, the transmission mode may be changed only by the GI mode selection so as to be strong against the signal delay effect, without changing the bandwidth. That is, the above-described switching process of the Wi-Fi mode is accompanied by a bandwidth change, and the carrier spacing is narrowed. This may serve as a factor which becomes sensitive to the Doppler shift. In this case, only the cyclic prefix may be lengthened so as to be strong against the signal delay effect. Then, the inter-symbol interference may be reduced, and the data rate may be increased.

More specifically, the wireless transmitter in accordance with the embodiment of the present invention includes a control device which operates in a 0.4 us GI mode (short GI mode) when signal delay caused by multipath fading is small in the IEEE 802.11n mode, and operates in a 0.8 us GI mode (long GI mode) when the signal delay is large. The signal delay effect by multipath fading is an example of an indicator showing a channel state, and may be substituted with a performance indicator, such as a packet error rate or throughput, which shows the link performance. In this embodiment of the present invention, the GI mode which may be expanded in such a principle may be used in the IEEE 802.11ac mode of which the standardization is in progress or a new wireless communication standard. That is, when the signal delay is small, the control device operates in the 0.4 us mode. When the signal delay is large, the control device operates in the 1.2 us mode. When the signal delay has an intermediate value, the control device operates in the 0.8 us mode. This operation may be implemented by the following process. That is, the mode may be selected by comparing signal delay values (channel profiles) through the comparison of threshold values which may be corrected by a programmable register.

In the IEEE 802.11n WLAN standard, the seventh bit of the HT signal field shown in FIG. 6 is used to set the short GI mode. In the VHT mode of the IEEE 802.11ac of which the standardization is in progress, additional bit allocation is required to support the 0.4/0.8/1.2 us modes as described above. Therefore, the embodiment of the present invention may be identically applied to such a new frame structure.

In this embodiment, it has been described that the signal field information of the transmitted packet is utilized for the mode selection. This method does not have a compatibility problem, and is very effective in the mode switching. Without being limited thereto, however, this method may be realized by using the information field of a control packet or MAC header, based on the same principle.

Channel Environment Adaptive Mobile Terminal Mode Decision Method

Next, a channel environment adaptive mobile terminal mode decision method will be described.

The WLAN transmitter in accordance with the embodiment of the present invention, which may perform reconfiguration for high mobility and high through, basically operates in the 802.11n mode or 802.11a/b/g mode which is a low mobility and high throughput mode. That is because all mobile bodies start from a stationary state. The WLAN transmitter in accordance with the embodiment of the present invention may start the mode switching process when detecting mobility, and may switch the low mobility mode to the high mobility mode, with an increase of mobility. The mode of a mobile station is decided depending on a channel environment. As the changed mode information is loaded into the above-described packet to be transmitted, an access point (AP) prepares to receive the packet of which the mode is switched. A mode switching request and response protocol for this operation will be described below. Now, the channel environment adaptive mobile terminal mode decision method will be described.

In the OFDM scheme, when each carrier has a flat fading profile, signal distortion does not occur. On the other hand, when a signal bandwidth is larger than a channel response variation, signal distortion occurs. That is, the spacing between the respective carriers needs to be determined to guarantee flat fading in the carriers. Simultaneously, the carrier spacing needs to be larger than the maximum Doppler spread, in order to minimize the inter-carrier interference.

Figure 9:
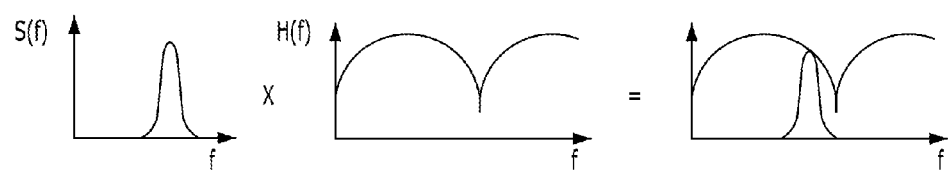
FIG. 9 is a frequency waveform in a case of general flat fading.
Figure 10:
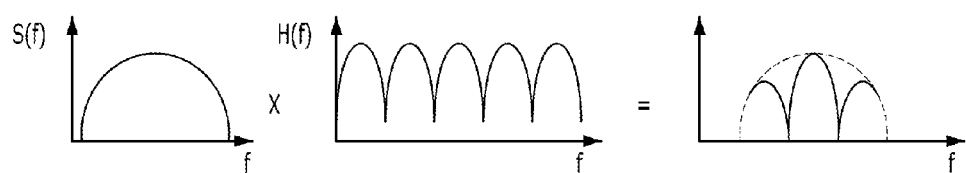
FIG. 10 is a frequency waveform in a case of general selective frequency fading.

When a transmitted signal is represented by S(f), a channel response is represented by H(f), and a received signal is represented by R(f), the receive signal may be expressed as R(f)=S(f)×H(f). FIG. 9 shows a frequency waveform in the case of flat fading and FIG. 10 shows a frequency waveform in the case of frequency selective fading.

The embodiments of the present invention include a method for deciding a WLAN mode and a GI mode depending on a channel, state and a control device thereof. In this embodiment, a specific channel state indicator will be taken as an example. However, other channel state indicators may be used to decide a WLAN mode and a GI mode. In order for understanding of the present invention, the specific channel state indicator is divided into a time-domain parameter and a frequency-domain parameter.

First, a process of deciding the mode of a mobile station by using a time-domain parameter will be described.

Figure 11:
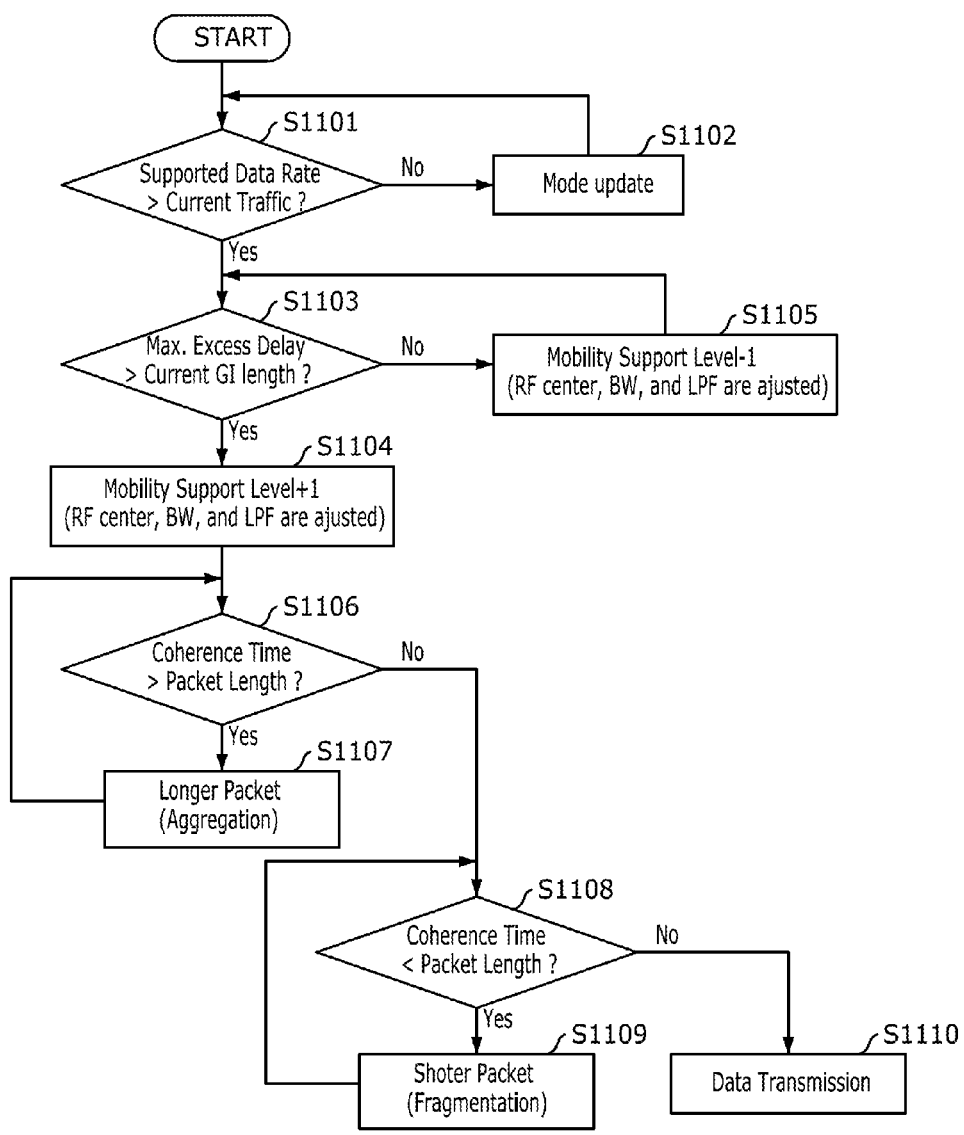
FIG. 11 is a flow chart showing a mode control method using a time domain parameter in accordance with the embodiment of the present invention.

FIG. 11 is a flow chart showing a transmission mode decision method using a time-domain parameter in accordance with the embodiment of the present invention.

When the data rate of a mode supported by a station is equal to or larger than current traffic at step S1101, the current data rate is maintained. However, when the data rate of the mode supported by the station is smaller than current traffic, the mode is updated at step S1102. For example, when the current mode is the IEEE 802.11a mode, a maximum data rate of 54 Mbps may be supported, and the throughput may approach about 27 Mbps. At this time, when the traffic is 40 Mbps, the mode is switched to the IEEE 802.11n mode, the maximum data rate of 270 Mbps may be supported, and the throughput may approach 100 Mbps or more.

A maximum excess delay value measured after the mode decision depending on the traffic and a current cyclic prefix length are compared to decide a physical layer mode such as a bandwidth and a carrier frequency spacing. That is, when the maximum excess delay value is larger than the current cyclic prefix length at step S1103, performance degradation may occur due to the inter-symbol interference. Therefore, a mobility support level is increased by one level at step S1104. On the other hand, when the maximum excess delay value is smaller than the current cyclic prefix length, the mobility support level is reduced by one level to increase the efficiency of the data rate at step S1105. Here, the increase or reduction of the mobility support level may be performed by adjusting an RF converter, a bandwidth, or a low-pass filter.

After the optimization of the physical layer parameter is completed, a packet length and a coherence time are compared to decide a packet length suitable for a stable channel period. When the packet length is smaller than the coherence time at step S1106, a plurality of packets are aggregated to increase the transmission efficiency at step S1107. On the other hand, when the packet length is larger than the coherence time at step S1108, the packet is fragmentized by the unit of the coherence time at step S1109. When the coherence time is equal to the packet length, data is transmitted at step S1110.

Next, a transmission mode decision method using a frequency-domain parameter will be described.

Figure 12:
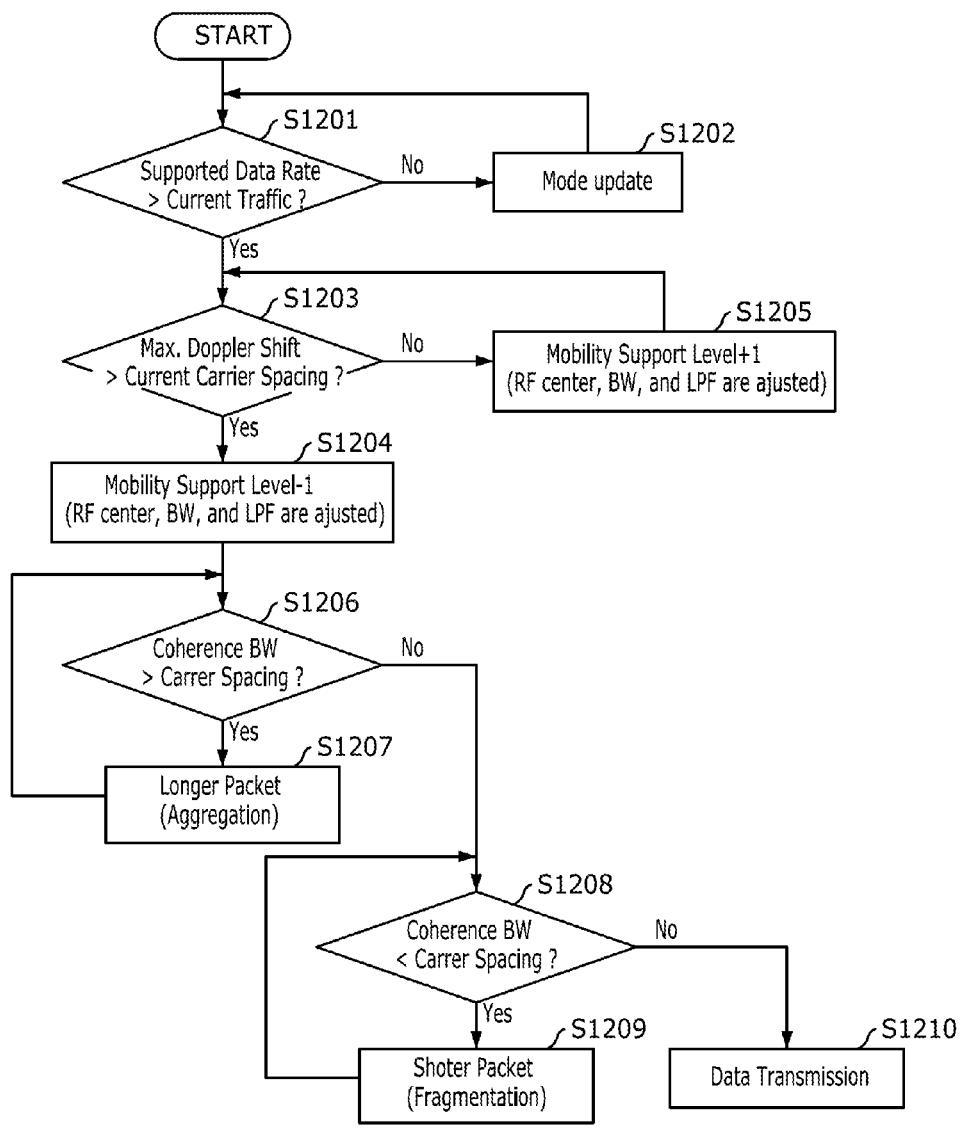
FIG. 12 is a flow chart showing a mode control method using a frequency domain parameter in accordance with the embodiment of the present invention.

FIG. 12 is a flow chart showing a transmission mode decision method using a frequency-domain parameter in accordance with the embodiment of the present invention.

When the data rate of a mode supported by a station is equal to or more than current traffic at step S1201, the current data rate is maintained. However, when the data rate of the mode supported by the station is smaller than the current traffic, the mode is updated at step S1202.

After the modem mode is updated, a maximum Doppler shift and a current carrier spacing are compared to decide a physical layer mode such as a bandwidth and carrier spacing. That is, when the measured maximum Doppler shift is larger than the current carrier spacing at step S1203, the performance degradation occurs due to the inter-carrier interference. Therefore, the mobility support level is reduced by one at step S1204. On the other hand, when the maximum Doppler shift value is smaller than the current carrier spacing, the mobility support level is increased by one at step S1205.

After the optimization of the physical layer parameters is completed, the carrier spacing and a coherence bandwidth are compared to decide a packet length for guaranteeing an effective period of a channel estimation value within one packet. When the coherence bandwidth is larger than the carrier spacing at step S1206, a plurality of packets are aggregated to increase the transmission efficiency at step S1207. On the other hand, when the coherence bandwidth is smaller than the carrier spacing at step S1208, the packet is fragmentized at step S1209. Furthermore, when the coherence bandwidth is equal to the carrier spacing, data is transmitted at step S1210.

Protocol for Supporting High Mobility and High Data Rate

In the WLAN standard, a carrier sense multiple access with collision avoidance (CSMA/CA) scheme is used as a MAC protocol. In the CSMA/CA scheme, stations connected to one AP contend for a transmission opportunity (TXOP) to communicate with the AP, based on a contention and avoidance scheme using a back-off algorithm and a carrier sense algorithm. A station acquiring a transmission opportunity occupies a channel for a predetermined period.

In general, packet spacing is differently defined depending on the types of contents. Therefore, the respective stations contend with each other for a transmission opportunity during a contention window. When a station acquires a transmission opportunity, the station transmits a data packet, and waits for a response packet ACK to the transmitted packet. When the station receives the response packet, the station again contends with other stations for channel occupation. When the station does not receive a response packet, the station contends with other stations for a transmission opportunity to retransmit a failed packet.

Typically, the WLAN supports a contention-type protocol and a non-contention-type protocol. In general, a commonly-used product uses a contention-type protocol. When the contention-type protocol is used, a station which is to transmit data as described above repetitively performs the series of operations of acquiring a transmission opportunity through a contention, transmitting a data packet, and receiving a response packet. Such a contention-type protocol may be used together with a non-contention-type protocol in which an AP administers a communication sequence with terminals. The embodiment of the present invention may be applied to both of the contention-type protocol and the non-contention-type protocol.

Figure 13:
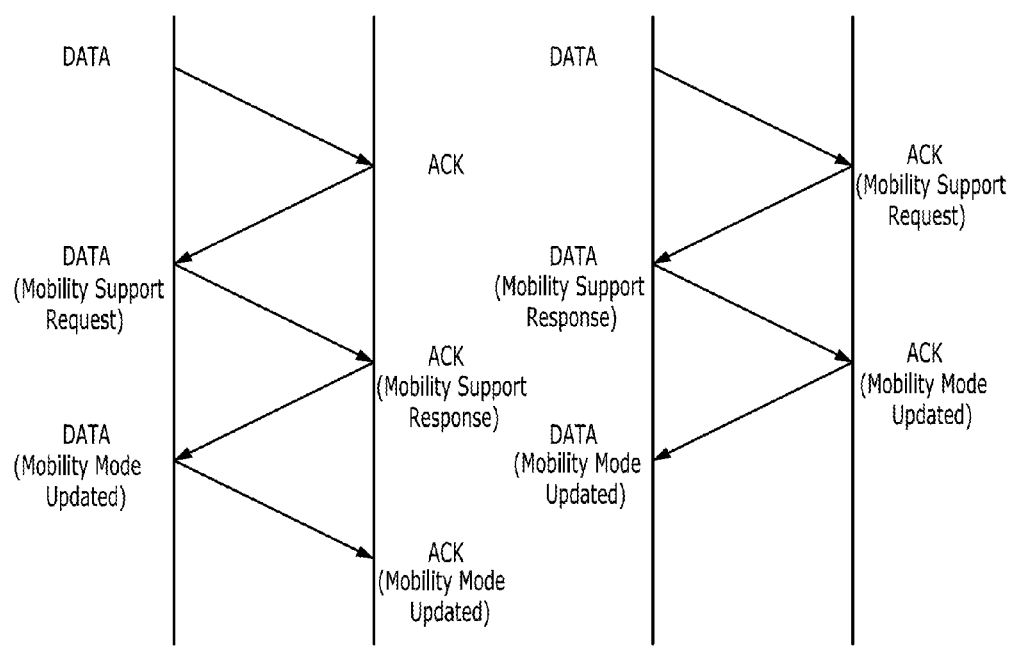
FIG. 13 is a diagram explaining a process of transmitting and receiving request and response packets for supporting high mobility in accordance with the embodiment of the present invention.

FIG. 13 is a diagram showing an example in which a protocol using request and response packets for supporting high mobility is used. Referring to FIG. 13, the mobility support request and response may be performed by using a data frame or response frame.

As described above, a station decides a mode, a data rate, and a packet length depending on a channel environment. Furthermore, the station informs a corresponding station or AP of the mode of a packet to be transmitted at the next time, by utilizing a reserved bit R of a signal field of the packet. Here, a request packet for supporting high mobility is a packet of which the reserved bit R of the signal field is not 0. Furthermore, a response packet informing whether or not to support high mobility is transmitted in a state in which the information is included in a reserved bit R of a legacy signal field thereof. When the reserved bit R of the response packet is 1, the mobility support is possible. Therefore, the mode of the packet may be switched, and the packet may be then transmitted. When the reserved bit R is 0, the mobility support is impossible. Therefore, the current mode is maintained.

FIG. 14 is a diagram showing an example in which a protocol is used in accordance with the embodiment of the present invention. FIG. 14 shows a case in which a station is gradually changed from a stationary state to a high mobility state, by using a few packets. In reality, after an operation is performed for one mode during a predetermined period, mode switching may be performed on the basis of statistical results.

In FIG. 14, symbols (a), (b), and (c) show a process in which the mobility gradually increases. In particular, symbol (c) shows a mode switching process, when it is assumed that traffic of 40 Mbps or more is required. In the stationary state, the operation starts with the HT-ML0 mode which may support 160 Mbps throughput. In a high mobility state, the mode is switched to the HT-ML1 which may support 80 Mbps throughput. In a very high mobility state, the mode is switched to the HT-ML2 mode which may support 40 Mbps throughput.

The station senses a channel profile. Then, when a signal delay is large, the station switches the operation mode by increasing a cyclic prefix length. Even at this time, the station switches the operation mode through the same request and response process, and selects a mode by utilizing the GI mode information of the HT or VHT signal field.

As described above, when the mobility of a station is low, the existing IEEE 802.11a/b/g/n mode is used. When the mobility increases, the mode is switched to the IEEE 802.11p mode, the HT-ML1 mode, or the HT-ML2 mode. Alternatively, the cyclic prefix mode is switched to improve an ability to channel adaptation. Specifically, the symbol length of a signal to be transmitted differs depending on the mobility in accordance with the embodiment of the present invention.

Figure 15A:
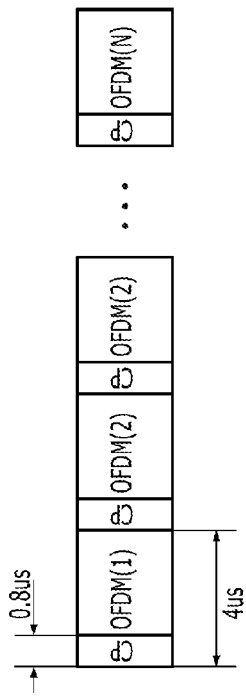
FIGS. 15a to 15c are diagrams showing timing for mobility level.
Figure 15B:
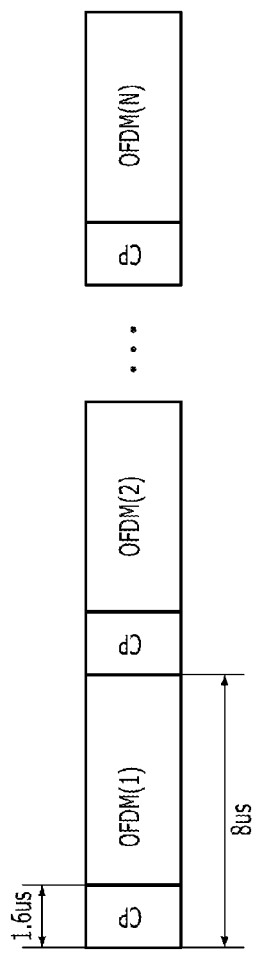
Figure 15C:
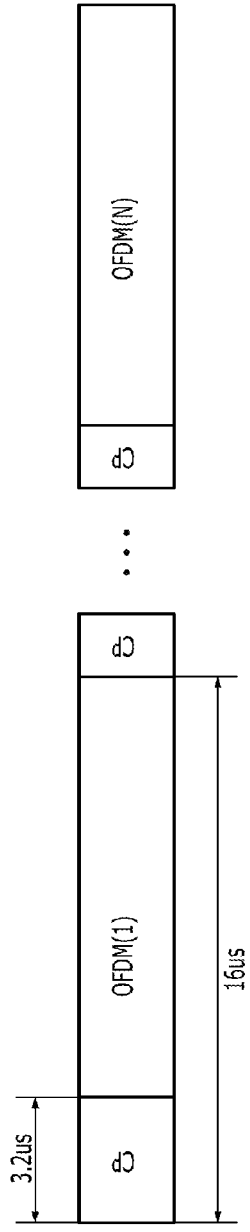

FIG. 15A shows the ML0 mode which is a low mobility and high data rate support mode. FIG. 15B shows the ML1 mode which is an intermediate mobility and intermediate data rate support mode. FIG. 15C shows the ML2 mode which is a high mobility and low data rate support mode.

When the symbol length of transmitted data increases, a signal processing time required for decoding and detecting a corresponding symbol in a reception terminal is also increased sufficiently. Therefore, decoding performance may be improved by increasing the iteration number of a decoding algorithm for decoding one symbol according to a conventional iterative decoding method. Accordingly, it is possible to guarantee the performance of the wireless communication system even in a channel variation and high mobility environment.

Figure 16A:
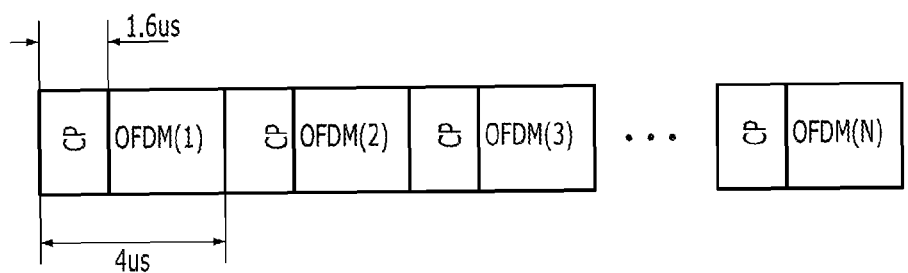
FIGS. 16a and 16b are diagrams showing timing depending on a cyclic prefix length.
Figure 16B:
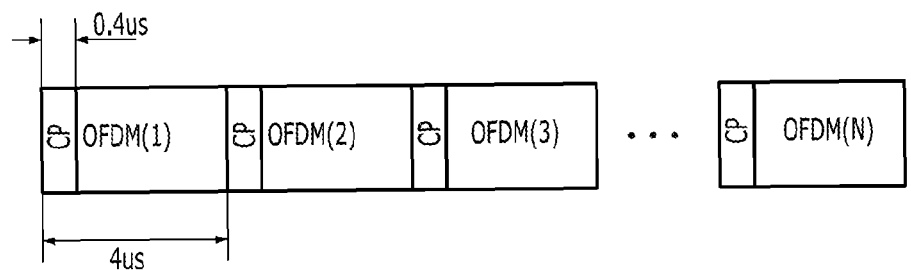

FIGS. 16A and 16B show mode switching according to a cyclic prefix corresponding to two times larger or ½ times smaller cyclic prefix than the 0.8 us cyclic prefix of FIG. 15A. FIG. 16A shows a case of a 1.6 us cyclic prefix, and FIG. 16B shows a case of a 0.4 us cyclic prefix.

In accordance with the embodiment of the present invention, the length of the cyclic prefix as well as the length of the data symbol is increased. Therefore, it is possible to prevent the performance degradation caused by the inter-symbol interference. Furthermore, when the length of the cyclic prefix is not sufficient, only the cyclic prefix may be doubled. When the cyclic prefix is too long in comparison with the signal delay effect by multipath fading, the degradation of data rate caused by overhead may be detected. In this case, the cyclic prefix may be shortened to improve the performance.

The embodiment of the present invention may be applied to the IEEE 802.11ac standard (VHT standard) of which the standardization is in progress. In this embodiment, as the mobility increases, the operation frequency may be multiplexed in such a manner that the physical layer characteristic becomes strong against a channel variation. Furthermore, as the operation frequency decreases, the power consumption efficiency is improved.

The present invention has been proposed to improve mobility and throughput in a wireless transmission technology field. When the IEEE 802.11n standard in which the maximum throughput of 270 Mbps may be realized in a low mobility environment such as a pedestrian speed level is compared with the IEEE 802.11p standard in which the maximum throughput of 27 Mbps may be realized in a high mobility environment such as a car speed level, the embodiments of the present invention may provide the maximum throughput of 135 Mbps in the high mobility environment. Furthermore, the mode of a wireless station is decided according to the signal field information of a transmitted packet, a Doppler shift which differs depending on an environment surrounding the station, a signal delay effect, an SNR, a packet error rate, and a traffic volume. The wireless station may be controlled to operate according to the decided made. Furthermore, the embodiment of the present invention may be applied to the IEEE 802.11ac (VHT: Very High-Throughput) standard of which the standardization is in progress, based on the same principle.

The embodiments of the present invention can be written as computer programs and can be implemented in general-use digital computers that execute the programs using a computer readable recording medium including CD-ROM, RAM, ROM, a floppy disk, a hard disk, a magneto-optical disk or the like. Such a process may be easily performed by those skilled in the art. Therefore, the detailed descriptions thereof are omitted.

While the present invention has been described with respect to the specific embodiments, it will be apparent to those skilled in the art that various changes and modifications may be made without departing from the spirit and scope of the invention as defined in the following claims.

What is claimed is:
1. A wireless transmitter which performs reconfiguration for high mobility and high throughput, the wireless transmitter comprising:
  memory; and
  a processor coupled to the memory and configured to perform operations comprising:
    determining a mobility level according to a movement speed of a wireless terminal;
    deciding an operation mode according to at least one among the mobility level, a required data rate, and wireless link performance;

generating a plurality of clock signals having different frequencies from each other;

selecting clock signals corresponding to the operation mode among the plurality of clock signals according to the operation mode; and modulating transmission data by adjusting a signal bandwidth of a frequency domain and a transmission time of a time domain using the selected clock signals, wherein the signal bandwidth and the transmission time are adjusted according to the operation mode, wherein the operation mode includes a multi-bandwidth mode and a multi-interval mode, wherein the multi-bandwidth mode includes a full bandwidth mode, a half bandwidth mode, and a quarter bandwidth mode, wherein the multi-interval mode includes a basic interval mode, a 2× interval mode of the basic interval mode, and a 3× interval mode of the basic interval mode, wherein the signal bandwidth and the transmission time are adjusted in the multi-bandwidth mode and the multi-interval mode to optimize the reconfiguration, and wherein the operation mode is decided by using a combination of reserved bits of plural signal fields in a frame.

2. The wireless transmitter of claim 1, wherein the operation mode is decided by using a current traffic volume and a time domain parameter.

3. The wireless transmitter of claim 1, wherein the operation mode is decided by using a current traffic volume and a frequency domain parameter.

4. The wireless transmitter of claim 1, wherein the operation mode is decided by using a request frame and a response frame with a corresponding station.

5. The wireless transmitter of claim 4, wherein the operation mode is decided by using a signal field of a media access control (MAC) frame.

6. The wireless transmitter of claim 5, wherein the operation mode is decided by using a reserved bit of the signal field of the MAC frame.

7. A wireless transmitter which performs reconfiguration for high mobility and high throughput, the wireless transmitter comprising:

memory; and a processor coupled to the memory and configured to perform operations comprising:

determining a mobility level according to a movement speed of a wireless terminal;

deciding an operation mode according to at least one among the mobility level, a required data rate, and wireless link performance; and modulating transmission data by adjusting a cyclic prefix length according to the operation mode, wherein a signal bandwidth of a frequency domain and a transmission time of a time domain are adjusted according to the operation mode, wherein the operation mode includes a multi-bandwidth mode and a multi-interval mode, wherein the multi-bandwidth mode includes a full bandwidth mode, a half bandwidth mode, and a quarter bandwidth mode, wherein the multi-interval mode includes a basic interval mode, a 2× interval mode of the basic interval mode, and a 3× interval mode of the basic interval mode, wherein the signal bandwidth and the transmission time are adjusted in the multi-bandwidth mode and the multi-interval mode to optimize the reconfiguration, wherein the cyclic prefix length is adjusted by the transmission time, and wherein the operation mode is decided by using a combination of reserved bits of plural signal fields in a frame.

8. The wireless transmitter of claim 7, wherein the operation mode is decided by using a current traffic volume and a time domain parameter.

9. The wireless transmitter of claim 7, wherein the operation mode is decided by using a current traffic volume and a frequency domain parameter.

10. The wireless transmitter of claim 7, wherein the operation mode is decided by using a request frame and a response frame with a corresponding station.

11. The wireless transmitter of claim 10, wherein the operation mode is decided by using a short guard interval (GI) field of a signal field of a MAC frame.

* * * * *